United States Patent Office  3,556,857
Patented Jan. 19, 1971

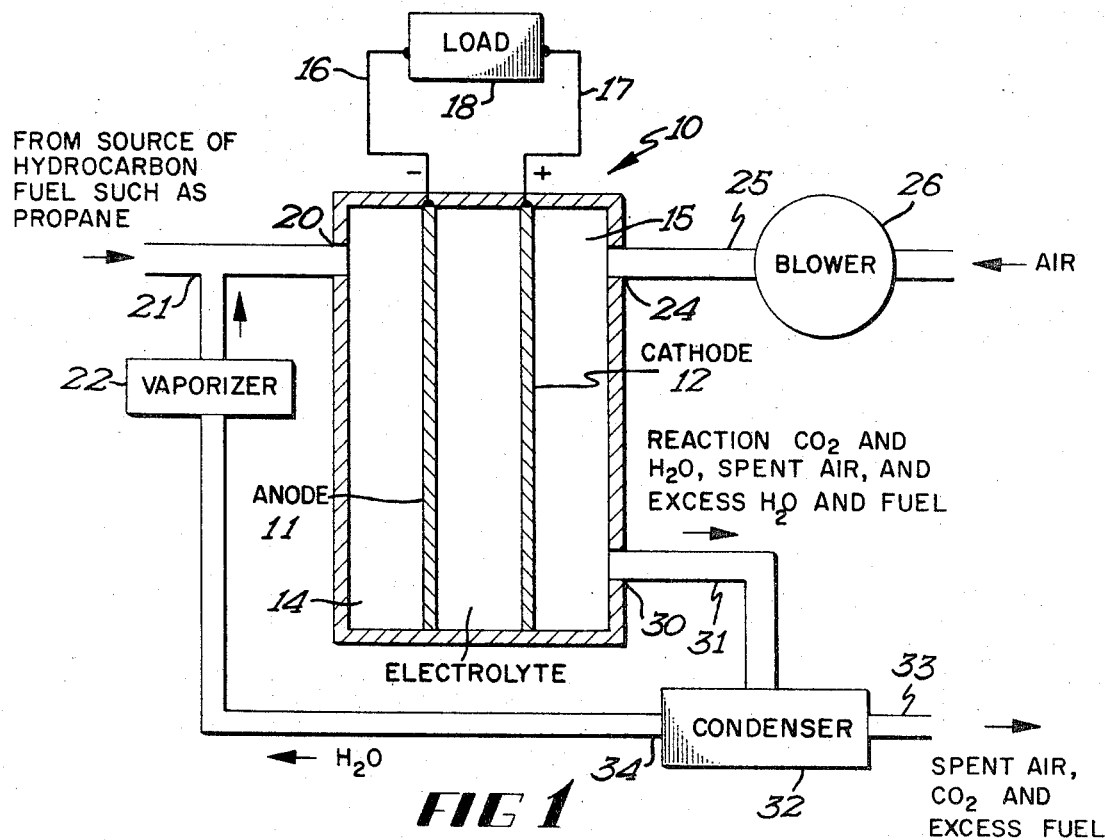
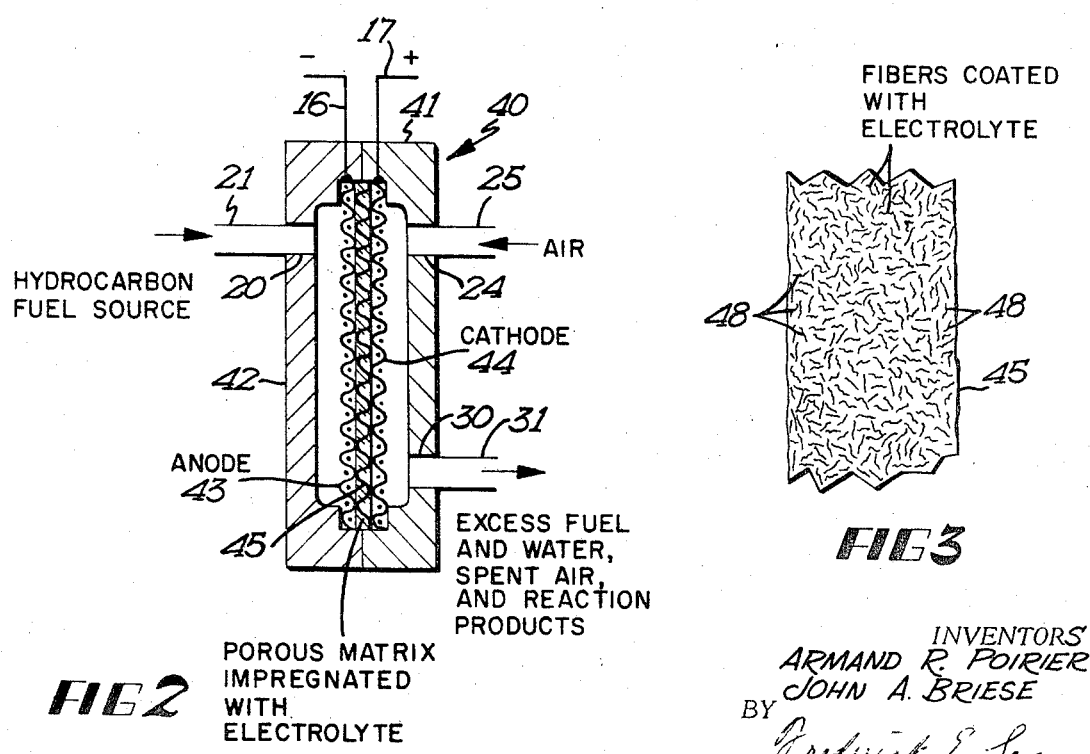

3,556,857
FUEL CELL
Armand R. Poirier, Utica, Mich., and John A. Briese, Idaho Falls, Idaho, assignors to Onan, a division of Studebaker Corporation, Minneapolis, Minn., a corporation of Delaware
Continuation-in-part of application Ser. No. 392,651, Aug. 27, 1964. This application Aug. 23, 1968, Ser. No. 754,859
Int. Cl. H01m 27/00
U.S. Cl. 136—86                                              8 Claims

ABSTRACT OF THE DISCLOSURE

A fuel cell in which there are porous fuel and oxygen electrodes and an interposed porous matrix containing an electrolyte and in which an excess of hydrocarbon fluid fuel is introduced into the fuel electrode compartment and is forced through the fuel electrode, the electrolyte matrix, and the oxygen electrode, and out through an exhaust passage in the oxygen electrode compartment to carry with it any reaction products occurring at the fuel and oxygen electrodes.

---

This application is a continuation-in-part of application, Ser. No. 392,651, filed Aug. 27, 1964, now abandoned.

In one type of fuel cell, the fuel employed is a hydrocarbon fluid fuel while the oxygen containing fluid may be air. By the use of a hydrocarbon fuel as a fuel and the use of air to supply the oxygen, it is possible to operate the fuel cell relatively inexpensively as compared with the type of fuel cell in which pure hydrogen and oxygen are employed. In this type of fuel cell, the reaction product resulting from the hydrocarbon coming in contact with the electrolyte is carbon dioxide. Unless some means is employed for removing this carbon dioxide, the carbon dioxide and any other inert materials build up in the pores of the porous anode electrode and the diffusion of the fuel to the reaction zone will be impaired with the result that the electrode will become severely polarized. In order to overcome this disadvantage, it has been previously proposed to pass excess fuel into and out of the compartment in which the fuel electrode is located so as to "scrub" the surface of the electrode to remove the inert gases including the carbon dioxide. The disadvantage of this arrangement is that it requires considerable excess fuel to free the reaction zone from the inert materials. Using commercially available diffusion electrodes, it has been found that it has been necessary to employ as much as 18 times as much gaseous fluid fuel as is theoretically required to sustain the electrochemical oxidation reaction. Where liquid fuels are employed, it has been necessary to employ as much as 80 times the fuel theoretically required to sustain the electrochemical reaction. In order, under these circumstances, to achieve a high fuel utilization efficiency, it would be necessary to recycle the fuel exhaust stream. This recycling of the fuel stream would necessitate additional equipment which would add undesirable complexity and cost to a fuel cell system.

We have found that the ratio of fuel feed necessary to remove the reaction products to that necessary for the electrochemical reaction can be markedly reduced by forcing the excess fuel through the anode electrode, through the electrolyte, and through the cathode and exhausting it along with the reaction products out through the oxygen electrode compartment. By forcing the fluid fuel through the anode electrode, the carbon dioxide and other inert material is effectively removed without employing such a large amount of excess fuel as is required in a scrubbing action in which the fuel passes into and out of the fuel electrode compartment.

It is accordingly an object of the present invention to provide a fuel cell of the type employing a hydrocarbon fuel in which an excess of hydrocarbon fuel is provided and is caused to pass through the fuel and oxygen electrodes, and is exhausted out of the oxygen electrode compartment.

A still further object of the present invention is to provide such a fuel cell in which water necessary for the electrochemical reaction is introduced into the fluid fuel prior to its introduction into the fluid fuel compartment.

A still further object of the present invention is to provide such an arrangement in which an execss amount of water is introduced into the fluid fuel and in which this water, along with the water resulting in the reaction at the oxygen electrode, is withdrawn along with the excess fuel, is separated therefrom, and is reintroduced into the fluid fuel.

A still further object of the invention is to provide an arrangement such as set forth in the previous paragraph in which the electrolyte is an aqueous electrolyte and in which the aqueous content of the electrolyte is maintained by the passage of the excess water therethrough.

A further object of the present invention is to provide such a fuel cell in which the container housing the same is sealed except for the two inlet passages and the single exhaust passage from the oxygen compartment.

A still further object of the invention is to provide a fuel cell such as set forth above, in which the electrolyte is applied to the elements of a porous matrix located between the fuel and oxygen electrodes.

Other objects of the invention will be apparent from a consideration of the accompanying specification, claims and drawing, of which:

FIG. 1 is a schematic view of our fuel cell and the means for supplying fuel, water and an oxygen containing gas to the cell;

FIG. 2 is a sectional view showing in more detail, but still schematically, the arrangement of the anode and cathode electrodes with respect to a porous matrix containing the electrolyte; and FIG. 3 is a fragmentary view of the porous matrix element shown on a somewhat larger scale than in FIG. 2.

Referring to FIG. 1, numeral 10 is used to indicate an electrolyte container, shown in section, in which is located a fuel electrode or anode 11, and an oxygen electrode or cathode 12. As will be described in more detail in connection with FIG. 2, the two porous electrodes 11 and 12, shown in section, are mounted in the sealed container 10, spaced from each other and from the inner side walls of the container 10 to provide a fuel electrode compartment 14 and an oxygen electrode compartment 15. It is to be understood that the two electrodes 11 and 12 are in contact with electrolyte within container 10, as indicated by a legend on the drawing. As will be pointed out in connection with FIG. 2, the container 10 is in actual practice, a porous matrix to which the electrolyte adheres without interfering with the porosity of the matrix. In one particular embodiment, an 85% solution of phosphoric acid ($H_3PO_4$) was employed. The two electrodes 11 and 12 are connected through suitable terminals and conductors 16 and 17 to a suitable load device 18. It will, of course, be understood that conductors 16 and 17 and the means for connecting the same to the electrodes 11 and 12 are suitably insulated from the walls of the container 10.

The fuel electrode compartment 14 is provided with an opening 20 to which is connected a conduit 21 connected to a suitable source of hydrocarbon fuel. In one particular example of our device, we have employed propane as the hydrocarbon fuel. Prior to its introduction into the fuel electrode compartment, water vapor is introduced into the fuel by a vaporizer 22, which is supplied with water in a manner subsequently to be described.

The oxygen electrode compartment is provided with an opening 24, which is connected with a conduit 25, which is supplied with a blower 26 with an oxygen-containing gas. In the specific embodiment referred to above, we have employed air as the oxygen-containing gas.

The oxygen electrode compartment 15 is also provided with an outlet connection 30 connected to a conduit 31 leading to a condenser 32, outlet connection 30 being the only outlet from the sealed container 10. Conduit 31 is designed to exhaust various reaction products and the excess water and fuel, which, as will be presently pointed out, are introduced into the fuel electrode compartment 14. Among the reaction products, in the particular embodiment discussed above, are water and carbon dioxide. The condenser 32 is designed to remove the water and separate it from the various gaseous components introduced into the condenser 32 by conduit 31. These gaseous components are discharged through a conduit 33. The water removed by the condenser 32 passes through a conduit 34 to the vaporizer 22.

It will be appreciated that both the fuel electrode 11 and the oxygen electrode 12 will have incorporated therein suitable catalysts such as platinum black to facilitate the electrochemical reaction.

As was noted above, an excess of hydrocarbon fuel over and above that needed for the electrochemical reaction is introduced through conduit 21 into the fuel electrode compartment 14. Water is also introduced through the action of vaporizer 22. The effect of the introduction of the propane and water is to cause an anode reaction represented by the following formula:

$$C_3H_8 + 6H_2O \rightarrow 3CO_2 + 20H^+ + 20e^-$$

The air introduced into the oxygen electrode compartment 15 results in the following reaction:

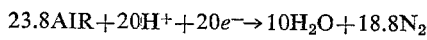

$$23.8 AIR + 20H^+ + 20e^- \rightarrow 10H_2O + 18.8N_2$$

The above reaction are facilitated by the catalysts present in the electrodes and the relatively high temperature at which the fuel cell is operated, which as pointed out below may be 300° F.

As is conventional with cells of this type, the negatively charged electrons released through the reaction above described flow from the anode 11 through conductor 16, load 18, and conductor 17 back to the cathode 12.

It will be noted from the above reactions that carbon dioxide is produced at anode 11. If this carbon dioxide were not removed, it would tend to build up in the pores of the electrode 11 and the electrode would become severely polarized, impairing the diffusion of the fuel to the reaction zone. As has been pointed out above, it has been proposed in the past to eliminate this difficulty by passing a very substantial amount of fuel through the fuel chamber 14 causing the carbon dioxide to be swept away from the fuel electrode 11. This excess fuel is then exhausted from the compartment 14. In order to accomplish this, it is necessary to introduce many more times the amount of fuel than is needed for the electrochemical reaction. In a typical case employing gaseous fuels, as pointed out above, it has been found necessary to employ as much as 18 times as much fuel as would otherwise be necessary.

In our apparatus, we have eliminated, in the preferred form, any exhaust passage from the fuel electrode compartment 14. We then introduce an excess of hydrocarbon fuel but a relatively small excess. In one embodiment of our invention, we have found that we need to introduce only twice as much fuel as is needed for electrochemical reaction. Since the fuel is admitted under pressure and has no other means of escape, the container 10 being sealed except for inlet passages 20 and 24 and outlet passage 30, the fuel that is not consumed in the electro-chemical reaction is forced through the porous electrode 11, through the electrolyte (which, as shown in more detail in FIG. 2, is retained within a porous matrix), the porous cathode or oxygen electrode 12 and out through the exhaust conduit 31 to the condenser 32. Since the excess fuel actually passes through the porous anode or fuel electrode 11 instead of merely sweeping over it, it is possible to effectively remove the carbon dioxide formed in the reaction at the oxygen electrode with a relatively small excess of fuel. While the excess fuel is introduced into the oxygen electrode compartment 15 containing oxygen, we have found it is possible to mix a hydrocarbon fuel, such as propane, with oxygen without creating any dangerous effects.

Not only is an excess of fuel forced through the two porous electrodes 11 and 12 but this fuel carries with it any water over and above that necessary for the electrochemical reaction. This is particularly desirable in connection with an aqueous electrolyte since these fuel cells may be operated at a relatively high temperature such as 300° F. There is a tendency for the electrolyte to dry out and lose its water content. When an excess of water is forced through the electrolyte, as is the case in our invention, the water content of the electrolyte is continually replenished. This has its further advantage that it becomes unnecessary to introduce water into the air being supplied to the oxygen electrode compartment 15, as has often been done with prior structures. Even where a nonaqueous electrolyte is employed, the introduction of some excess water into the hydrocarbon fuel simply assures that adequate water will be present for the electrochemical reaction. The excess water has no harmful effect since it is swept out through the exhaust passage 31.

As will also be noted from the above reaction appearing at the oxygen electrode 12, water is produced as the reaction product at the oxygen electrode. This excess water is also swept out through the conduit 31. Since air is employed rather than pure oxygen, the remaining constituents of the air after the oxygen has been used, which constituents are primarily nitrogen, will also pass out through the conduit 31.

As mentioned above, the various gases and the water discharged through conduit 31 enter the condenser 32. The water in the gases will be condensed out in condenser 32 and the remaining gases will pass out through conduit 33. The water condensed out will be supplied through conduit 34 to vaporizer 22. Under some conditions, this water may be fed by gravity through conduit 34 or a wick may be employed in conduit 34 for feeding the water to the vaporizer 22. The water so condensed out, after being vaporized, is introduced into the fuel source so that it becomes unnecessary to constantly add water from an outside source.

In the above description, the electrolyte chamber has been treated as though the electrolyte were merely a liquid within the contained between the two porous electrodes 11 and 12. It will be obvious that, as pointed out later, the electrolyte portion must be porous to allow the passage of the excess fuel, the carbon dioxide and the water vapor. Various methods may be employed for maintaining the electrolyte in contact with the two porous electrodes 11 and 12. In FIG. 2, we have shown somewhat schematically in section one construction employed by us to maintain the electrolyte in contact with the anode and cathodes. In this figure, the electrolyte housing, designated by the reference numeral 40, consists of two halves 41 and 42 which are held together in sealed relationship. Clamped between the two halves 41 and 42 at their outer peripheries are a porous anode electrode 43, a porous cathode electrode 44, and a porous matrix 45 which is impregnated with a suitable electrolyte. The two electrodes and the matrix are shown exaggerated in thickness for clarity of illustration. The anode electrode 43 and the cathode electrode 44 are preferably formed of a wire mesh of a suitable metal such as tantalum. This wire mesh is coated with a suitable catalyst such as platinum black. The elements of the porous matrix 45 are coated with a suitable electrolyte. In one particular embodiment, we employed an 85 percent solution of phosphoric acid ($H_3PO_4$). The porous matrix may be formed of any material capable of resisting the acid and heat involved. We have found glass fiber to be one material which is very satisfactory for this purpose.

As will be noted from FIG. 3, which is an edge view of a fragmentary portion of the matrix, the matrix 45 consists of a large number of glass fibers 48 which are matted together in an irregular pattern to leave large numbers of interstices which collectively provide numerous passages through the matrix 45. In impregnating the matrix, it is immersed into the electrolyte and the excess electrolyte allowed to drain off. The result is that each fiber has a coating of the electrolyte but there still remain numerous passages through the matrix 45 adequate for the passage of any excess gaseous hydrocarbon fuel and any excess water. At the temperature of operation of the fuel cell, any such excess water is, of course, in vapor form.

As shown in connection with the more schematic drawing of FIG. 1, the housing section 42 is provided with an opening 20 to which is secured the conduit 21 leading to the source of hydrocarbon fuel. Similarly, the other housing section 41 is provided with an opening 24 in which is secured conduit 25 leading to a suitable source of fluid containing oxygen, such as air. Similarly, we have shown in FIG. 2, the opening 30 and the conduit 31 for exhausting the various substances present in the oxygen chamber formed between the oxygen electrode 44 and the inner wall of the housing section 41.

The operation of the overall system employing a unit such as that of FIG. 2 is the same as that described above. It will be obvious that since both the electrodes 43 and 44 are porous and since the matrix holding the electrolyte is similarly porous, the excess hydrocarbon fuel, the water contained therein, and the carbon dioxide produced as a reaction byproduct at the fuel electrode 43 is able to pass through the fuel electrode 43, the matrix 45 and the oxygen electrode 44 so that it, along with the water formed at the oxygen electrode 44, and the unused constituents of the air can pass out through exhaust opening 31.

While various modifications of the various elements could be employed, we found it desirable in one particular application to use an anode made of a tantalum screen containing nine milligrams of platinum catalyst per square centimeter of electrode area bonded on the screen with a substance such as Teflon. An anode having a geometrical area of one-half square foot was employed. A typical tantalum screen of the type is that made by American Cynamid Company and designated as their Type 1–AA, Serial No. LD–213–392–3A. A similar material is used for the cathode, the only difference being that the American Cynamid Serial Number was LD–213–392–2A. As far as the invention is concerned, however, the anode and cathode can be identical. In the same example, an 85 percent solution of phosphoric acid ($H_3PO_4$) was employed within a fiber glass matrix. While the matrix material can be any suitably porous fiber glass material, the material used in the particular example was formed of three sheets of Whatman glass fiber filter paper, Type CF/B. As pointed out above, the filter paper was initially immersed in the electrolyte and the excess electrolyte allowed to drain off with the result that each fiber had a coating of the electrolyte but there still remained numerous passages through the matrix between the coated fibers adequate for the passage of any excess hydrocarbon fuel and any excess water in vapor form. The fuel used in the particular example was a fuel containing 99.5 percent of propane and the oxidant was a mixture of 80 percent nitrogen and 20 percent oxygen. The fuel cell operating temperature was 300° F. An inlet fuel flow rate of the air mixture was 0.84 standard cubic foot per hour. There was an inlet flow rate of water of 0.5 milliliter per minute. The vapor pressure of the exhaust stream was 400 millimeters of mercury. The pressure difference between the fuel and air across the matrix was four inches of water vapor. At an output of six amperes per square foot of fuel cell surface, the fuel ratio was 2.25. With the same current output, the air ratio was 7.95. The fuel ratio is the ratio of the actual fuel used to that theoretically required for the reaction. The air ratio, similarly, is the ratio of the actual air used to that theoretically required. Using this equipment, at open circuit conditions, a voltage output of 0.745 volt was obtained. Where the load current was two amperes per square foot of fuel cell surface, the load voltage was 0.470 volt. Where the load current was four amperes per square foot, the load voltage was .400 volt. When the load current was increased to six amperes per square foot, the load voltage was 0.300 volt. All of the above load voltage figures were taken under steady state conditions, a steady state condition being assumed when the voltage did not vary more than 20 millivolts in five minutes. The cell was kept under a load current of two amperes per square foot of fuel cell surface for six hours. The voltage did not vary more than five millivolts during this time.

CONCLUSION

It will be seen that we have provided a fuel cell in which hydrocarbon fuel is employed as a fuel and in which the reaction byproducts formed at both the fuel electrode and the cathode electrode are effectively removed with a relatively small excess amount of fuel. Moreover, any excess water introduced into the fuel, as well as the water produced at the oxygen electrode, are not only withdrawn but are recovered and utilized again to introduce the necessary water into the hydrocarbon fuel.

While we have shown a specific embodiment of our invention for purposes of illustration, it is to be understood that the invention is limited solely by the scope of the appended claims.

We claim as our invention:
1. A fuel cell comprising
   an electrolyte container having a porous electrolyte matrix with an electrolyte therein, said electrolyte matrix and electrolyte being sufficiently porous to permit the passage of a gas therethrough,
   a porous fuel electrode,
   a porous oxygen electrode,
   both said electrodes also being sufficiently porous to permit the passage of a gas therethrough,
      said fuel electrode and said oxygen electrode being spaced apart from each other, and from the internal wall of said container and on opposite sides of said electrolyte matrix in contact therewith to form a fuel electrode compartment and an oxygen electrode compartment,
   an outlet connection leading from said oxygen electrode compartment,
   means for supplying to said oxygen electrode compartment an oxygen containing gas,
   means for supplying to said fuel electrode compartment a hydrocarbon gaseous fuel in an amount in excess of that required for the electrochemical reaction,
   said outlet from said oxygen electrode compartment constituting the only outlet means from said container capable of exhausting said excess fuel so that said excess fuel is forced through said porous fuel and oxygen electrodes and said porous electrolyte matrix to carry with it into said oxygen electrode compartment any reaction product occurring at said fuel electrode,
   and means for exhausting through said outlet connection from said oxygen electrode compartment said excess hydrocarbon gaseous fuel, any such reaction product occurring at said fuel electrode, and any reaction product occurring at said oxygen electrode.

2. The fuel cell of claim 1 in which the electrolyte container is sealed except for the passages for supplying the oxygen containing gas and the hydrocarbon gaseous fuel and for exhausting from the oxygen electrode compartment, the excess hydrocarbon gaseous fuel and the reaction products.

3. The fuel cell of claim 1 in which the hydrocarbon gaseous fuel and the oxygen containing gas are of such character and the temperature of operation of the fuel cell is such that the electrochemical reaction occurring in the fuel cell produces water in said oxygen electrode compartment and carbon dioxide in said fuel electrode compartment, and in which said means for exhausting through said outlet connection exhausts said water and said carbon dioxide along with said excess gaseous fuel.

4. The fuel cell of claim 1 in which there is means for separating the water present in the substances withdrawn from said oxygen electrode compartment from the other of said substances and for introducing said water in vaporized form into the hydrocarbon gaseous fuel being supplied to said fuel electrode compartment.

5. The fuel cell of claim 1 in which the means for supplying the hydrocarbon gaseous fuel to the fuel electrode compartment supplies a mixture of water vapor and hydrocarbon gaseous fuel and in which there is means for exhausting not only the excess gaseous fuel from said oxygen electrode compartment, but also any excess water therefrom.

6. The fuel cell of claim 5 in which the means for supplying to said fuel electrode a mixture of vaporized water and hydrocarbon fuel includes means for separating the water present in the substances withdrawn from the electrode compartment from the other substances so withdrawn and for supplying the same to the source of hydrocarbon gaseous fuel.

7. The fuel cell of claim 1 in which the electrolyte matrix is formed of a fibrous material, the fibers of which are coated with the electrolyte.

8. A method of operating a fuel cell which fuel cell comprises an electrolyte container having a porous electrolyte matrix with an electrolyte therein, said electrolyte matrix and electrolyte being sufficiently porous to permit the passage of a gas therethrough, a porous fuel electrode, a porous oxygen electrode, both said electrodes also being sufficiently porous to permit the passage of a gas therethrough, said fuel electrode and said oxygen electrode being spaced apart from each other, and from the internal wall of said container and on opposite sides of said electrolyte matrix in contact therewith to form a fuel electrode compartment and an oxygen electrode compartment, which method comprises:

supplying to said oxygen electrode compartment an oxygen containing gas, supplying to said fuel electrode compartment a hydrocarbon gaseous fuel in an amount in excess of that required for the electrochemical reaction, forcing said excess fuel through said porous fuel and oxygen electrodes and said porous electrolyte matrix to carry with it into said oxygen electrode compartment any reaction product occurring at said fuel electrode, and exhausting from said oxygen electrode compartment said excess hydrocarbon gaseous fuel, any such reaction product occurring at said fuel electrode, and any reaction product occurring at said oxygen electrode.

References Cited

UNITED STATES PATENTS

| | | | |
|---|---|---|---|
| 3,216,882 | 11/1965 | Feldt et al. | 161—109 |
| 2,925,454 | 2/1960 | Justi et al. | 136—86 |
| 3,201,283 | 8/1965 | Dengles | 136—86 |

WINSTON A. DOUGLAS, Primary Examiner

H. A. FEELEY, Assistant Examiner